June 30, 1942.  A. B. SCHLATTNER  2,288,304
MACHINE FOR DIE CUTTING PAPER
Filed May 22, 1941  5 Sheets-Sheet 1

INVENTOR.
Albert B. Schlattner
BY
Work, Arey, Herrin & Evans
ATTORNEYS

June 30, 1942.  A. B. SCHLATTNER  2,288,304
MACHINE FOR DIE CUTTING PAPER
Filed May 22, 1941   5 Sheets-Sheet 2

INVENTOR.
BY Albert B. Schlattner
Wood, Arey, Herron & Evans
ATTORNEYS

June 30, 1942.  A. B. SCHLATTNER  2,288,304
MACHINE FOR DIE CUTTING PAPER
Filed May 22, 1941  5 Sheets-Sheet 3

INVENTOR.
Albert B. Schlattner
BY
Wool, Arey, Herron & Evans
ATTORNEYS

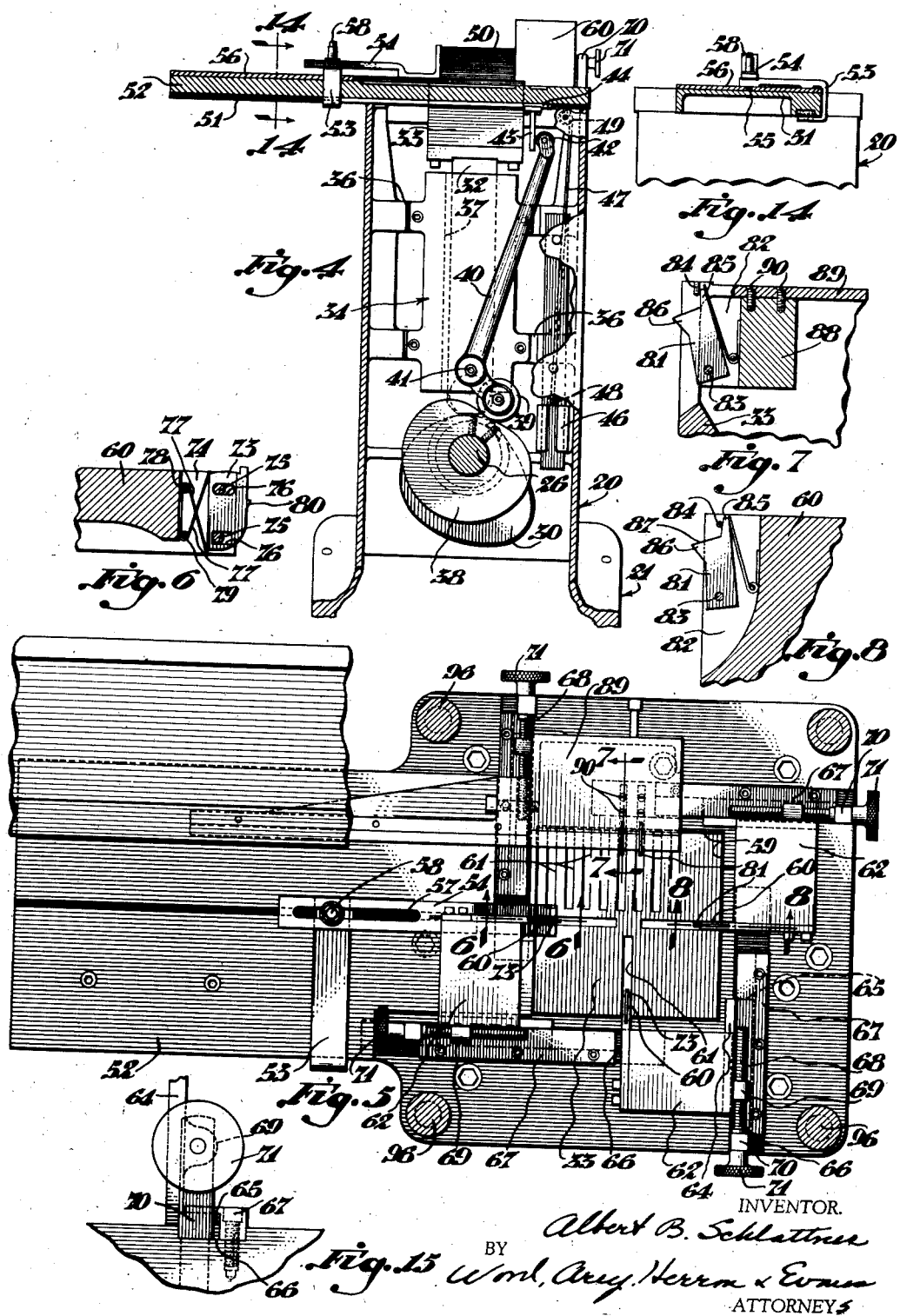

June 30, 1942.  A. B. SCHLATTNER  2,288,304
MACHINE FOR DIE CUTTING PAPER
Filed May 22, 1941   5 Sheets-Sheet 5
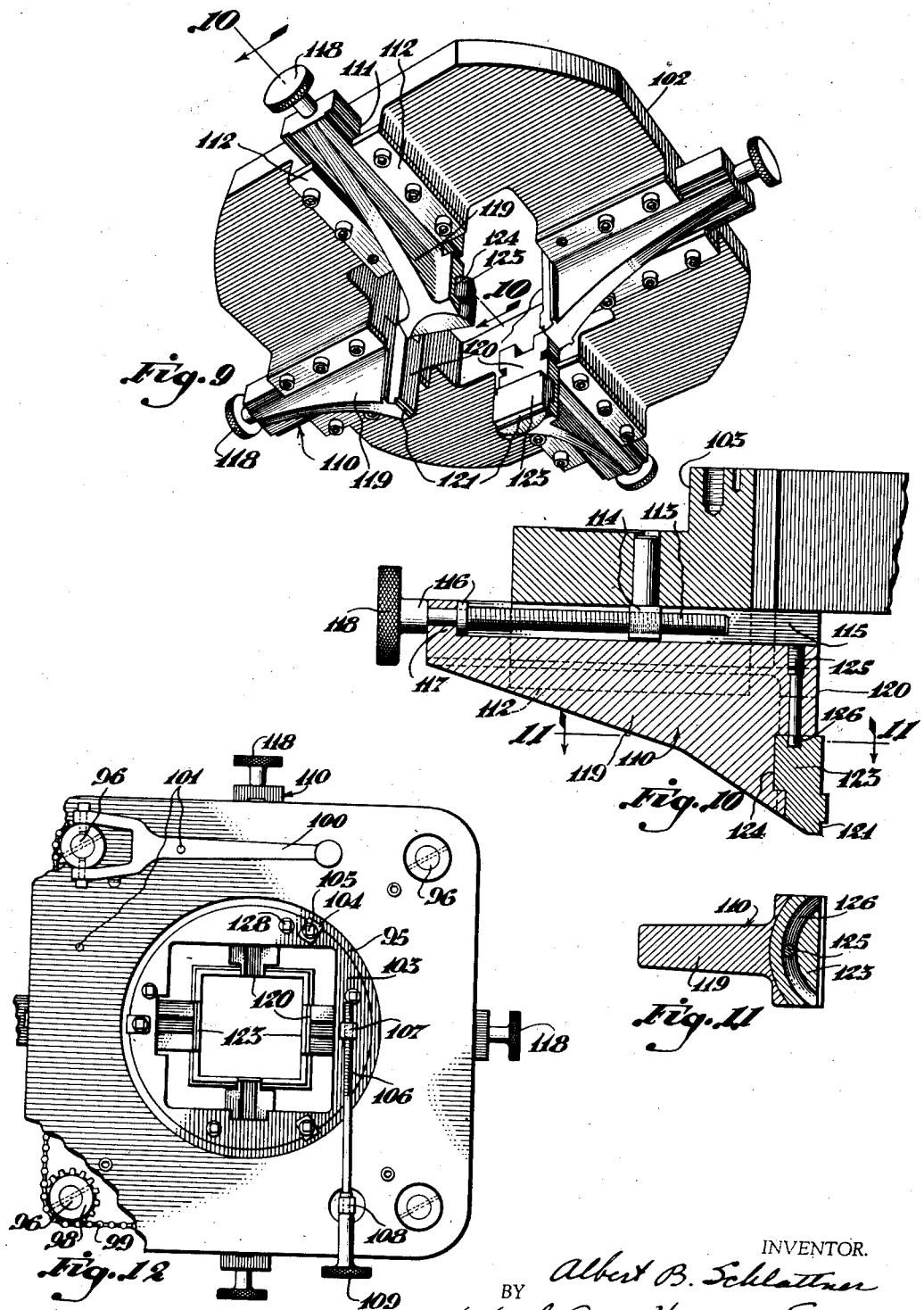
INVENTOR.
Albert B. Schlattner
BY Wood, Arey, Herron & Evans
ATTORNEYS Patented June 30, 1942

2,288,304

UNITED STATES PATENT OFFICE 2,288,304

MACHINE FOR DIE CUTTING PAPER

Albert B. Schlattner, Cincinnati, Ohio, assignor to The Printing Machinery Company, Cincinnati, Ohio, a corporation of Ohio Application May 22, 1941, Serial No. 394,685

13 Claims. (Cl. 164—24)

This invention relates to paper cutting machinery and is particularly directed to improvements in machines of the type adapted for cutting or trimming stacks of sheets, having labels printed thereon, in order to produce the finished labels. The machine to which the present improvements are directed has utility other than that specifically mentioned, as for example, in cutting blanks for bags or boxes, or in fact, for cutting wherever stacks of sheets of finished material which are to be cut to certain dimensions.

The machine incorporating these improvements, described in general, employs a hollow die and a cutting block or ram. The stacks of sheets to be cut, as for example, five hundred or one thousand in each instance, are delivered successively between the cutting block and the die and through an actuating mechanism are cut by engagement with the cutting edge of the die as they pass through the die. Thus, sheets of the desired shape or configuration are produced.

The present invention constitutes an improvement on the machines disclosed and claimed in the patents of Edma H. Curtis, Jr., No. 2,181,639, issued November 28, 1939, and of Harry Donnerberg and Edma H. Curtis, Jr., No. 2,220,056, issued October 29, 1940.

It has been one object of the present inventor to provide an improved mechanism for feeding the stacks of labels onto the cutting block. The present improvement resides in the fact that the feeding means, although returned by power, is actuated in its feeding stroke by means of a weight. Thus, the inventor provides feeding means which does not require adjustment such as might be necessary due to variation in the width of the sheets of the stack. The feed is flexible, automatically stopping when the stack reaches an abutment relative to the cutting block. Through this arrangement, there is no possibility of injury to the operator for the only pressure exertable upon the operator's hand in the event that it is in the path of feed, is that of the weight which is insufficient to do any harm. Additionally, damage to the stacks of labels or the machine, in case of a jam, cannot occur.

It has been a further object of the present inventor to provide an improved mounting for the die, whereby the die may be adjusted bodily rotatably to change its position relative to the cutting block. It has been a further object to include means within the mounting whereby die clamping fingers automatically adjust to fit the shape of the die. Toward this end the die is supported in a mounting unit which may be rotated bodily in the frame of the machine and which includes clamps having adjustable inserts adapted to engage the die.

It has been a still further object of this inventor to provide a die and guide means for cutting two labels out of a single blank. This is of particular importance in cases where the labels are extremely small and would be difficult to handle if printed on separate blanks. In the present invention, as these blanks incorporating two or more labels are forced through the die, they are cut and separated into individual stacks.

It has been a still further object of the present inventor to provide an improved mechanism for catching and holding or sustaining an uncut portion of the stack against the cutting edge of the die as the cutting block returns. The structure in this case, as in the previous structure shown in the above patents, consists of fingers which engage the stack. The improvement resides in the formation of these fingers whereby the retention of a portion of the stack and the operation of the fingers, relative to this portion as the next stack engages the retained portion, is more efficient; particularly, in that the detents do not damage the labels which have been retained and there is no binding or wedging of the fingers as the labels are moved against the cutting edges of the die.

Other improvements reside in the general structure of the machine, whereby it is more compact and whereby it is simplified Other objects and advantages will be more fully apparent from the description of the drawings in which:

Figure 4 is a sectional view taken on line 4—4, Figure 3, detailing the operating mechanism for the slide which feeds the successive stacks of labels into the machine.

Figure 5 is a sectional view taken on line 5—5, Figure 2, illustrating the relationship of the guides which direct the labels as they are cut and the detents in the guides, which detents retain the uncut portion of each stack against the cutting die.

Figure 6 is a fragmentary sectional view taken on line 6—6, Figure 5, detailing one of the detents at one side of the cutting block.

Figure 7 is a sectional view taken on line 7—7, Figure 5, illustrating one of the detents of the multiplicity at the lower side of the cutting block (considering its leaning position).

Figure 8 is a sectional view taken on line 8—8, Figure 5, illustrating one of the remaining and identical detents at the other two sides of the cutting block.

Figure 9 is a perspective view of the adjustable cutting die-supporting unit illustrating in detail the adjustable clamping brackets and omitting the die for purposes of illustration.

Figure 10 is a sectional view taken on line 10—10, Figure 9, detailing one of the clamping brackets.

Figure 11 is a sectional view taken on line 11—11, Figure 10, illustrating the rotative mounting of one of the clamping elements carried by the brackets.

Figure 12 is a top plan view of the machine, parts of which are broken away for purposes of illustration.

Figure 13 is a sectional view taken on line 13—13, Figure 2, illustrating the guide means for the ram which carries the cutting block.

Figure 14 is a sectional view taken on line 14—14, Figure 4, illustrating the mounting of the slide which feeds the stacks to the cutting block.

Figure 15 is a fragmentary side view of the table of the machine showing the adjustable mounting means for one of the guide fingers.

Figure 16 is a fragmentary sectional view showing a die of duplex type which may be utilized for cutting small labels.

Figure 17 is a plan view of a double label of the type for which the duplex die is utilized for cutting two labels.

Figure 1:
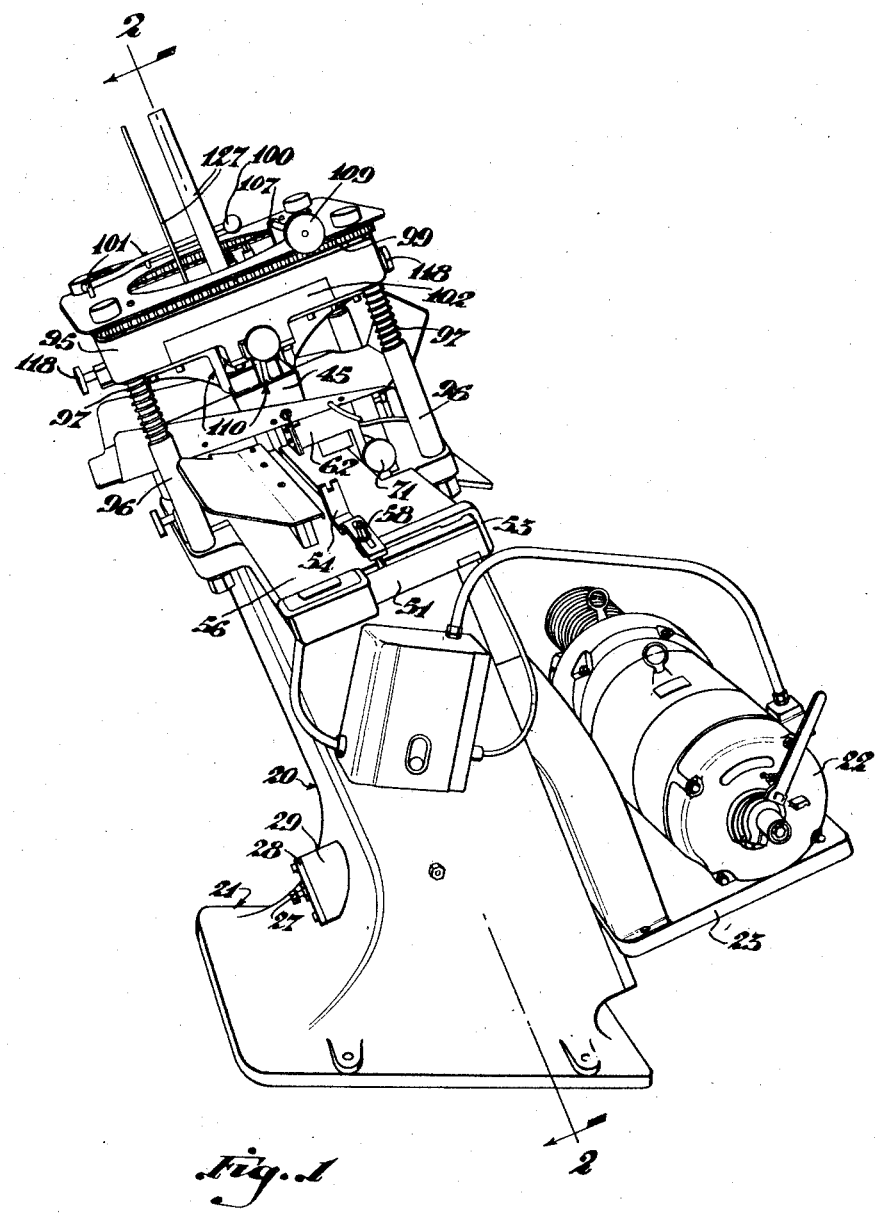
Figure 1 is a perspective view of the improved label-cutting machine looking toward one side thereof.
Figure 2:
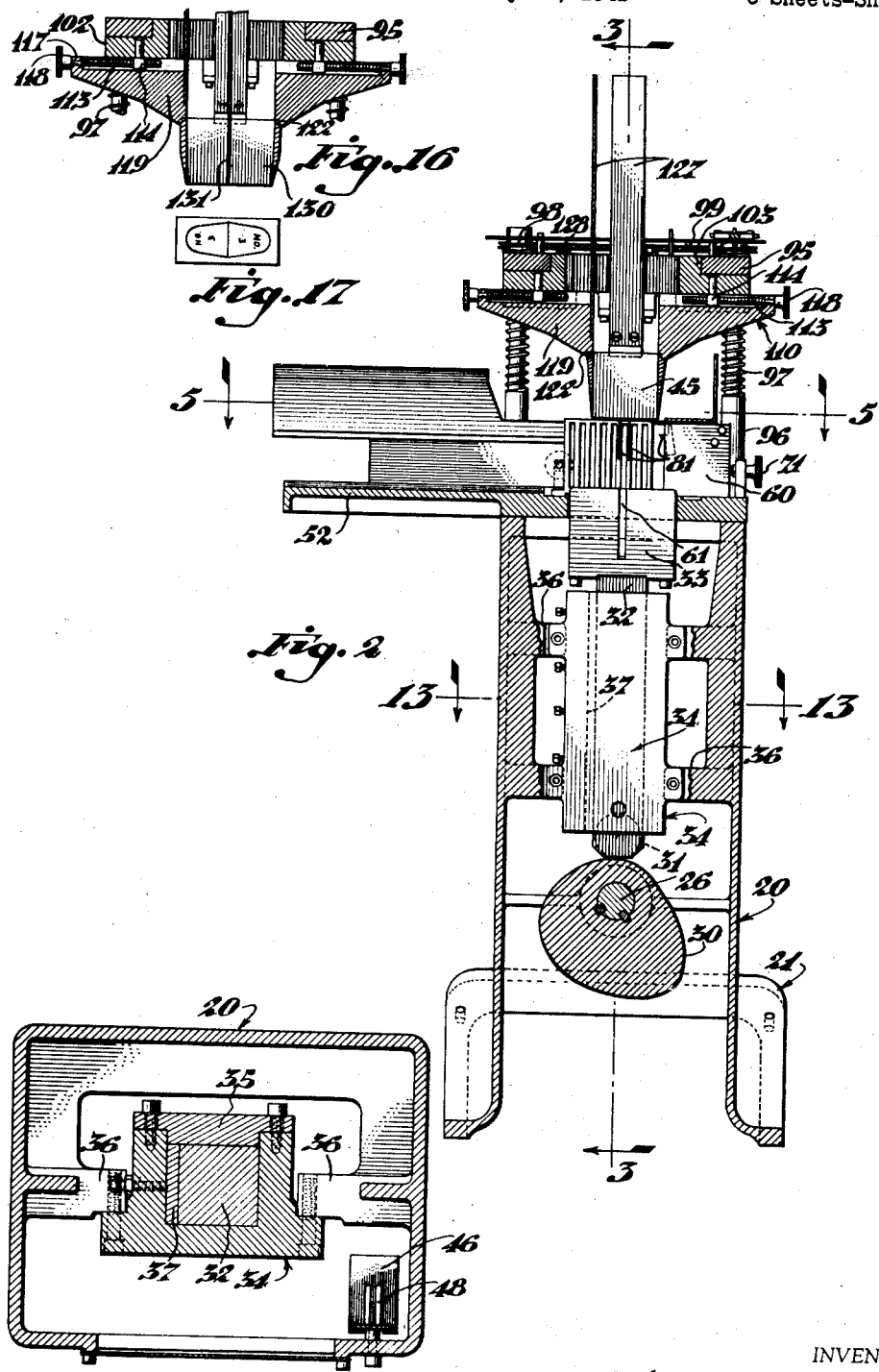
Figure 2 is a sectional view taken on line 2—2, Figure 1, illustrating generally the cutting block, the cutting die, and certain of the operating mechanism.

The machine disclosed in the drawings consists generally of a frame or base portion carrying the motor and the ram actuating mechanism. Provision is made for feeding a stack of labels onto a cutting block carried by the ram, whereupon these labels are elevated or forced against the cutting edge of a tubular die fixed in the upper end of the machine. The cut labels are forced upwardly through this die and through a guideway. For an understanding of the general mechanism of this application, reference may be made to the previously mentioned Patents Nos. 2,181,639, issued November 28, 1939, to Edma H. Curtis, Jr., and 2,220,056, issued October 29, 1940, to Harry Donnerberg and Edma H. Curtis, Jr.

Specifically described, an embodiment of the present improvements on this type of machine may consist of the following structure. Referring to the drawings, the frame of the machine is shown generally at 20. The frame or body incorporates a base portion 21. This base portion is constituted by a heavy flange extended horizontally from the body; which flange may be bolted to the flooring. Just as in the previous patents, referred to above, the body lens at a considerable angle with respect to the base.

Figure 3:
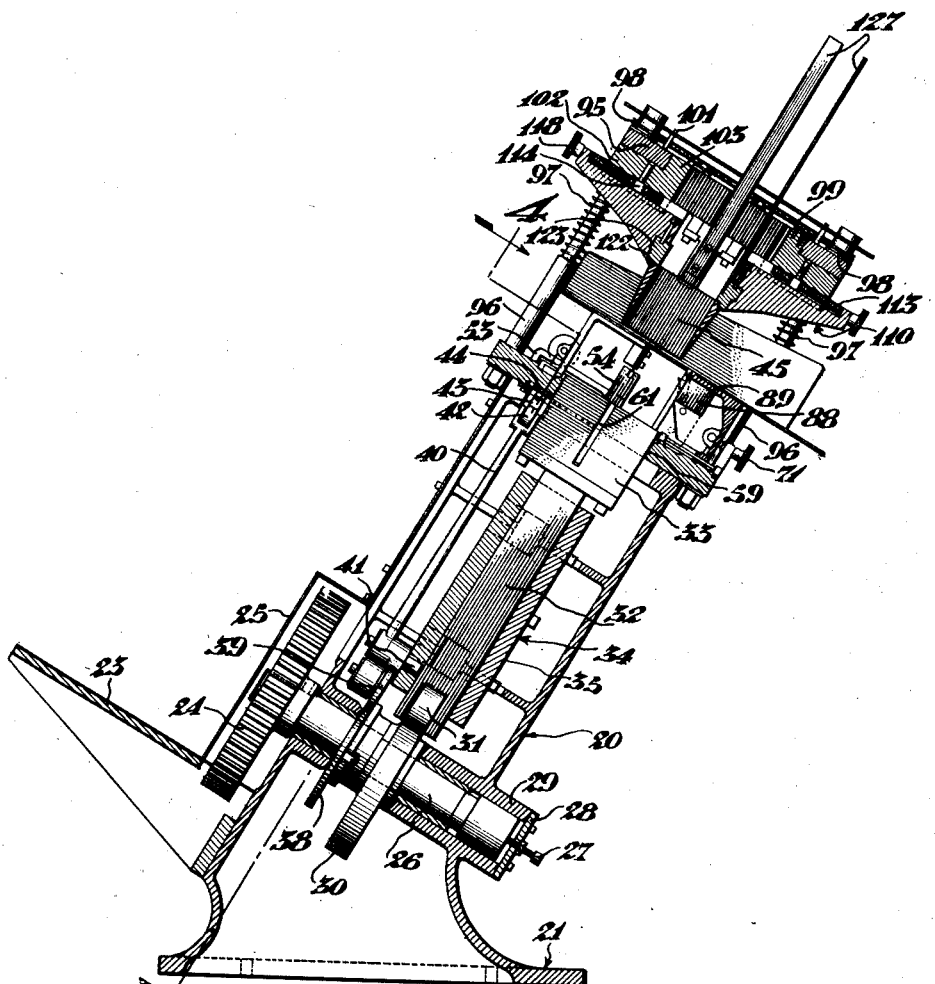
Figure 3 is a sectional view taken on line 3—3, Figure 2, further illustrating the cutting block, the cutting die, and the operating mechanism.

The motive power for the machine consists of an electric motor 22 supported on a bracket 23 fixed to the side of the body. Through a driving connection, not shown, this motor drives the gear 24 (Figure 3). The gear is encased by means of a shield 25 and is fixed on the extended end of a shaft 26. The shaft 26 is disposed at right angles through the leaning body (Figure 3) and therefore extends downwardly from the gear 24. It is maintained in correct position by means of an axially engaging set screw 27 engaged through a closure plate 28 at the outer end of the lower bearing boss 29 supporting the shaft.

A cam 30 is fixed to the shaft intermediate the bearing bosses and within the frame or body. This cam 30 engages a roller 31 journalled on a cross pin in a slot at the lower end of the ram 32. The ram carries the cutting block 33 at its upper end and is suitably guided in a guideway 34. The guideway 34 is sectional and includes a removable side 35 (Figure 13) for access to the ram. Its main section is fixed to lugs 36—36 of the body. A gib plate 37 is provided for adjusting the clearance or fit of the ram in the guideway.

Another cam 38 is fixed to the shaft 26 and engages a roller 39 (Figure 4) carried at one end of a bell crank 40. The bell crank is pivotally mounted or fulcrumed on a pin 41 carried by the guide 34 of the ram. The upper end of the bell crank carries a roller 42 engaged against a thrust member 43 projected downwardly from the bottom of the label feeding slide 44. At the same time that the ram 32 is reciprocated for moving a stack of labels upwardly against the die 45 (Figure 3) the bell crank is swung, in synchronism with the ram, for moving the feeding slide outwardly to pick up a stack of labels for feeding into position on the cutting block 33.

It is pointed out here that the slide 44 (Figure 4) is urged in its stack feeding direction by means of a weight 46. The weight is hung from the forward end of the feeding slide 44 by means of a cable 47 which is attached at its lower end between bifurcations 48 on the top of the weight. The cable extends up and around a pulley 49 fixed in the frame and is attached at its upper end to the forward end of the feeding slide 44. It will be apparent that the action of the cam 38 is merely to move the slide out to position to pick up the stack of labels, the stack being indicated in Figure 4 at 50.

The slide element 44 is disposed in a groove 51 in the bottom of a laterally extended shelf 52. An arm 53 is attached to the outer end of the slide element and extends around the edge of the shelf and over its top to a point centrally thereof (Figure 14). At this point, a pusher element 54 is adjustably fixed to the arm 53 in a direction longitudinally of the shelf portion upon which the stack is disposed and fed. The pusher includes a rib 55 projecting onto a slot in a wear plate 56 disposed on the top of the shelf, and thus, there is no opportunity for the lowermost sheets of the stack to slip under the pusher and all will be delivered in each feeding movement of the slide. As shown in Figure 5, the pusher 54 includes an adjustment slot 57 longitudinally thereof traversed by an attachment screw 58 which extends onto the arm 53. It will be apparent that the rib 55 also guides the pusher.

The cutting block moves upwardly through an opening 59 in the shelf 52 (Figures 3 and 5). When at its lowermost position, the top of the cutting block is disposed in the same plane as the top of the shelf whereby the stack may be slid onto the top of the cutting block without interference.

The general area to be occupied by a label of any given size, as the stack of labels is fed onto the cutting block, is defined by guide fingers 60 having their inner ends disposed adjacent each of the edges of the label. It is obvious, of course, that the finger at the intake or feeding side of the guideway defined by these fingers is disposed above the plane of movement of the incoming stack; that is to say, the stack may move under this finger as it is fed to the top of the cutting block.

As set forth in the previous Patent No. 2,181,639, the cutting block includes slots 61. These slots extend in from each edge of the cutting block toward the center. In order to provide ample support at that side of the cutting block toward which the machine leans, a multiplicity of these slots is provided to accommodate a multiplicity of fingers. Thus, the fingers may be moved in and out of the slots to define an area on the top of the cutting block of the outline and size of a given label. The adjustment mechanism for each finger is identical. It will be described in the singular only.

Referring to Figure 5 particularly, it is pointed out that the finger 60 in each case is carried by a bracket 62 extended over the top of the shelf or table 52 to mount the finger in position for movement into and out of its respective slot 61. This bracket provides an outer vertically disposed flange, upon which the finger is bolted. An inner flange 64 includes a foot portion 65 extending along the path of adjustment of the bracket and disposed for adjustable sliding movement in a groove 66 in the face of the table. A guide element or retainer 67 is fixed in the slot or groove 66 and overhangs the foot portion 65 for holding it in position. An adjustment screw 68 traverses a nut portion 69 on the inner flange of the bracket 62. This screw is held against axial movement in a lug 70 secured in the groove 66 toward the outer end thereof. The screw includes an adjustment knob 71.

Each of the fingers carries a detent. These detents are of different form for purposes more apparent hereinafter. The one above the intake side of the machine and the one at the upper side of the slanting table 52 are of the form shown in Figure 6. This type detent element, indicated at 73, is mounted in a slot 74 in the outer end of its supporting finger. It is mounted on a pair of cross pins 75—75 traversing horizontal slots 76 in the detent element. A pair of hairpin type springs 77—77 are mounted on respective cross pins 78 and 79 and have, in each case, one arm held against the inner end of the slot and the other arm engaging one end of the inner face of the detent. The outer face of the detent projects outwardly beyond the end of the supporting finger so as to register the sheets of paper of the stack as they move upward, and for this purpose, includes a catch or ledge portion 80 midway of its height.

The other fingers include detent elements 81 of the following form and they are mounted as follows: Each detent element 81 is mounted in a slot 82 at the inner end of the finger on a cross pin 83. It is constantly urged outwardly by means of a hairpin spring of the type previously described. This outward movement is limited by means of a cross pin 84 engaged by an upward extension 85 of the detent. The detent includes a catch portion or ledge 86 projected outwardly beyond the end of the finger. The top surface 87 of this catch portion is flat and is disposed so that its respective ends lie as nearly as possible on an arc described from the center of the pin 83.

At the lowermost side of the inclined delivery table, the detents 81 are mounted as shown in Figure 7. A separate support bracket 88 is provided for each detent, and these brackets are fixed in slots within a main adjustment bracket 89 by means of screws 90. Through this wide bracket ample support is thus provided at the side of the block toward which the stack rests so as to provide adequate support for the stack regardless of the length of the edges of the labels. The cutter block includes a number of slots and the number of detents used can therefore be varied, depending upon the size of the label being cut.

Now, in the operation of the machine, the cutting block moves the stack upwardly against the cutting die. The cutting block stops short of the cutting die and a number of the sheets of each stack is left uncut to serve as a protective pad between the cutting block and the cutting die as described in the previously mentioned patent.

The detents catch and hold the uncut portion of the stack as the cutting block retreats. The detents are depressed as the stack of paper passes between them; that is, they recede into the slots during passage and move outwardly as the stack is moved above them. The detents 73 which have the double spring mounting; that is, the type shown in Figure 6, force the sheets against the inner faces of the fingers opposite them and thus, the inner faces of the detents 73 serve as the guideway surface.

Due to the arrangement of the detents 81 wherein their supporting ledges have their surfaces disposed substantially on an arc drawn from the pivot pin, there is no tendency for these detents to tear through the suspended portion of the labels as the next succeeding stack of labels is forced up against the detents to cause them to swing back into their slots. Moreover, this arrangement provides that the detents are adapted to swing out immediately beneath the stack of suspended labels when the cutting block starts to return. In this way, there is no opportunity for too great a clearance space to occur between the detents and the bottom of the remaining portion of the stack.

It will be noted that the movement of the feeding means, moving the stack of labels onto the cutting block is brought about by means of the weight rather than by power. Motive power is used for return purposes only. Thus, no adjustment is necessary in the event that the area of the sheets varies, for the weight will do no more than to force the stack against the guide as shown in Figure 4. Also, in the event that the stack jams for any reason, no great amount of harm is done since the only pressure exerted on the jammed stack is brought about by the weight itself. The operator can take hold of the feeding element and hold it back at will and thus, the danger of harm to the operator is eliminated.

The cutting die, heretofore indicated at 45, is supported at the top of the machine by means of a frame element 95 mounted on four standards 96, one on each corner thereof. These standards are fastened to the table 52 and include counterturned portions extended through the element 95. Coil springs 97, under compression between the shoulders on standards 96 and the bottom of the element 95, support the element 95. There is a sprocket gear 98 screw-threaded upon the upper end of each standard and engaged against the top of the element 95. These sprocket gears are connected by means of a chain 99, as in the earlier Patent No. 2,220,056, so that rotation of one will rotate all and therefore permit lowering or raising of the element 95 while sustaining it in parallelism with the top of the cutting block. This adjustment means for the table is for the purpose of raising and lowering the cutting die, which, as will be described, is supported by the table element 95.

A means is provided on the hub of one of the gears for such adjustment. This means consists of a permanently attached wrench 100 of the spanner type. Pins 101 are placed outwardly of the axis of the particular gear hub, spaced apart 90° and adapted to cooperate in either case with an aperture in the handle of the spanner wrench. A cover plate is mounted on the element 95 providing clearance holes for the hubs of the gears and at its central portion for the upper guides.

An adjustable die carrying frame 102, shown in perspective in Figure 9, includes a circular hub 103 projected upwardly into a circular bore in the element 95 and is suspended for rotative adjustment in this bore by means of dogs 104. These dogs are attached to the circular hub portion 103 by means of screws 105 and are adapted to overhang the margin of the opening in the element 95, thereby supporting and permitting clamping of the adjustable element.

The die carrying frame 102 carries four adjustable clamp brackets which are adapted to engage upon and hold the die in position. This clamp assembly is adjusted rotatably by means of a screw 106 threaded, at one end, through a lug 107 on the upper side of the circular hub of the adjustable frame 102 and rotatively journalled, at the other end, in a lug 108 on the element 95. The lugs 107 and 108 are free to rotate or swivel on the elements 103 and 95 whereby the screw 106 will not bind in these lugs or be required to bend to permit appropriate movement of the element 103. Shoulders are provided on the screw, cooperating with the second lug 108 for preventing axial displacement of the screw. The screw includes the usual knob 109 for convenient rotation.

Each of the clamp brackets (Figure 10) consists of a body element 110 slidably sustained in a radially extended groove 111 in the bottom of the die carrying frame 102 by means of plates 112 secured to the underside of the frame 102 and engaging under flanges at the sides of the clamping brackets. Adjustment is brought about by means of a screw 113 traversing a nut element 114, fixed to the rotatably adjustable frame 102 and depending within a longitudinal groove 115 in the body element 110 of the clamping member. The screw is held against longitudinal movement by means of collars 116 at its outer end at each side of a lug 117 of the clamping member; one of which collars includes a knurled knob 118 for rotating the screw.

These clamping brackets are longitudinally ribbed, the rib 119 in each case flared to provide a flat, substantial, vertical inner face 120 for the bracket. At the lower inner edges of the clamping members, grooves 121 are provided having receding inner faces cooperating with the receding faces of the grooves 122 around the upper edge of the die (Figure 3), thus tending to wedge the die into clamped position when the members are drawn upon it by means of the adjustment screws 113. In the instance shown, each one of the two clamp brackets on the upper and lower sides of the die carries a removable clamp plate 123 supported for movement in an arcuate groove 124 within its face and at the lower end thereof. In these two brackets, the clamping grooves 121 are cut into the lower edge of the face of each clamp plate 123. The faces of the other two clamp brackets are plain as described above. The arcuate groove 124 is countersunk to receive the counterturned inner face of the clamping plate 123. The clamping element may be swung to change its angular position (Figure 11). It is held in position by means of a retaining pin or key 125 having its lower end projected snugly into an arcuate groove 126 in the upper face of the element. These pins or keys retain the clamping elements in position against displacement, but at the same time, permit easy shifting of the elements to fit the shape of the die automatically. Thus, these clamping fingers automatically set to any angular position when making contact with the die for accommodating dies of various shapes.

Thus, it has been provided that the die supporting and clamping unit may be rotated bodily to change the position of the die rotatively on an axis at right angles to the face of the cutting block, and the elements which clamp the cutting die automatically change their angular position to fit the shape of the die as the die is clamped between them.

Guideway strips 127 extend upwardly from each clamping member at two or three sides thereof to direct and support the cut stack of labels upwardly above the cover plate where they can be removed.

One of the screws 128 on each clamping plate assembly, which extends into the plate 112, constitutes a clamping screw adapted to clamp the particular die clamping element in set position.

As shown in Figure 16, a die 130 of duplex type may be incorporated or mounted in the machine. In this event, a central guide strip 131 extends upwardly. This type of die is used for cutting two labels out of a single blank (see Figure 17) as each cutting stroke takes place. The cut labels are separated and moved upwardly in respective delivery tracks. There is a decided advantage in this arrangement for cutting extremely small labels where a single label would of necessity be cut from a very small blank and a problem of handling would arise.

Having described my invention, I claim:

1. A machine for cutting labels or the like comprising a cutting block, a cutting die, said cutting block adapted to receive and support successive stacks of label blanks, said stacks of blanks adapted to be moved against the cutting edge of the die, a feeding shelf, a feeding slide for moving the stacks of blanks along the shelf onto the cutting block, an abutment disposed relative to the cutting block and against which the stacks are fed, a weight attached to the feeding slide and urging the slide in its stack feeding movement, and power means for returning the feeding slide to starting position.

2. A machine for cutting labels or the like comprising a frame, a die, a cutting block adapted to move the stacks of labels against the die, a mounting unit for said die, and means for mounting said die for rotative adjustment in said frame on an axis at right angles to the face of the cutting block, whereby its position may be changed relative to the cutting block.

3. A machine for cutting labels or the like comprising a die, a cutting block, a ram carrying said cutting block, a feeding slide for feeding stacks of labels onto said cutting block, means for actuating said slide, a casing supporting said previously named elements and containing said ram and slide actuating means, said casing disposed at an angle to the vertical, a shaft at the base of the casing, said shaft disposed at right angles across the casing, cams on said shaft within the casing for actuating said ram and slide actuating means, and a thrust bearing disposed against the lower end of the shaft for taking the axial thrust of the weight of the shaft.

4. A machine for cutting labels or the like comprising a die, a cutting block, a ram carrying said cutting block, a feeding slide for feeding stacks of labels onto said cutting block, means for actuating said slide, a casing supporting said previously named elements and containing said ram and slide actuating means, a shaft at the base of the casing, said shaft disposed across and within the casing, and cams on said shaft within the casing for actuating said ram and slide actuating means.

5. A machine for cutting labels or the like comprising a cutting block, a cutting die, said cutting block adapted to receive and support successive stacks of label blanks, said stacks of blanks adapted to be moved against the cutting edge of the die, a feed shelf, a feed slide for moving the stacks of blanks along the shelf onto the cutting block, an abutment disposed relative to the cutting block and against which the stacks are delivered, a weight, a pulley, a cable attached to the feed slide and extending over the pulley, said weight hung on said end of said cable for urging the slide in its stack feeding movement, means for guiding said weight, and a power driven cam for returning the feed slide to starting position.

6. A machine for cutting labels or the like comprising a frame, a cutting die, a cutting block adapted to move the stacks of labels against the die, a circular mounting unit for said die, label delivery guide means carried by said unit and extending above said die, means for mounting said die for rotative adjustment in said frame on an axis disposed parallel to the path of movement of the cutting block, and means for clamping the unit in position when adjusted whereby its position may be changed relative to the cutting block.

7. A machine for cutting labels or the like comprising a frame, a cutting die, and a cutting block adapted to move the stacks of labels against the die, said die having a label outlining edge and a cross edge for separating the label blank into two labels and means for delivering the labels from said die.

8. A machine for cutting labels or the like comprising a cutting block, a cutting die, said cutting block adapted to receive and support successive stacks of label blanks for moving them against the edge of the cutting die, a delivery slide for moving the stacks of blanks onto the cutting block, a weight attached to said feeding slide for normally urging it in stack feeding direction, and a power driven means disposed in contact with but not connected to said feeding slide for returning it after delivery movement.

9. A machine for cutting labels or the like comprising a frame, a cutting die, a cutting block adapted to move the stacks of labels against the die, a mounting unit for said die, means for mounting said die rotatively in said frame on an axis parallel to the path of cutting block movement, whereby its position may be changed relative to the cutting block, and die clamps carried by said mounting unit including automatically adjustable die engaging members whereby these members adjust to suit the shape of the die.

10. A machine for cutting labels or the like comprising a frame, a cutting die, a cutting block adapted to move the stacks of labels against the die, adjustable clamping members mounted on said frame adapted to engage upon and clamp the die in position, said clamping members including adjustable die engaging elements at their inner ends, said elements being rotatively mounted, and means for securing said elements in rotatably mounted positions.

11. A machine for cutting labels or the like comprising a frame, a cutting die, a cutting block adapted to move the stacks of labels against the die, said die having a label outlining edge and a cross edge for separating the label blank into two labels, and guide means extending from said die including a separator guide forming a continuation of said cross edge.

12. A machine for cutting labels or the like comprising a frame, a cutting die, a cutting block adapted to move successive stacks of labels against the cutting edge of said die, a guideway for guiding said labels as they are engaged against the die, detents disposed in the sides of said guideway slightly spaced from the cutting edge of the die, said detents being pivotally mounted, springs normally urging the detents outwardly, said detents including ledges for supporting an uncut portion of each stack against the cutting edge of the die as the cutting block retreats for receiving the next stack of labels, said ledges having surfaces disposed generally at right angles to the cutting edge of the die, and the respective ends of the surfaces disposed specifically on points on a circle generated on the pivotal axis of the respective detents.

13. A machine for cutting labels or the like comprising a frame, a cutting die, a cutting block adapted to move successive stacks of labels against the die, a guideway for guiding said labels as they are engaged against the die, detents disposed in the sides of said guideway slightly spaced from the cutting edge of the die, said detents being pivotally mounted and normally disposed into the path of movement of the stack, said detents including ledges for supporting an uncut portion of each stack against the cutting edge of the die as the cutting block retreats for receiving the next stack of labels, said ledges providing flat surfaces, the ends of which are disposed specifically on points on a circle generated on the pivotal axis of the respective detents.

ALBERT B. SCHLATTNER.